United States Patent [19]

Wiklund et al.

[11] Patent Number: 4,521,973
[45] Date of Patent: Jun. 11, 1985

[54] ELECTRONIC LEVELLING CELL

[75] Inventors: Klas R. Wiklund; Lars A. Ericsson, both of Täby, Sweden

[73] Assignee: Getronics AB, Danderyd, Sweden

[21] Appl. No.: 495,349

[22] PCT Filed: Oct. 1, 1982

[86] PCT No.: PCT/SE82/00311
§ 371 Date: May 11, 1983
§ 102(e) Date: May 11, 1983

[87] PCT Pub. No.: WO83/01304
PCT Pub. Date: Apr. 14, 1983

[30] Foreign Application Priority Data

Oct. 2, 1981 [SE] Sweden ................................ 8105840

[51] Int. Cl.³ .......................... G01C 9/06; G01C 9/20
[52] U.S. Cl. ......................................... 33/366; 33/377
[58] Field of Search .................. 33/292, 333, 366, 377

[56] References Cited

U.S. PATENT DOCUMENTS

| 2,592,941 | 4/1952 | Moore | 33/366 |
| 2,711,590 | 6/1955 | Wilcox | 33/366 |
| 2,825,978 | 3/1958 | Davis | 33/366 |
| 4,028,815 | 6/1977 | Buckley et al. | 33/366 |
| 4,377,912 | 3/1983 | Hakhverdian | 33/366 |

FOREIGN PATENT DOCUMENTS 726809 10/1942 Fed. Rep. of Germany ........ 33/366

Primary Examiner—Richard R. Stearns
Attorney, Agent, or Firm—Larson and Taylor

[57] ABSTRACT

An electronic level includes a conductive gravity-levelled reference element (33) and one or more pairs of sensing electrode members (A1-D1) supported in spaced confronting relation to the reference element on a flat rigid support (37) which is movable relative to the reference element. A dielectric fluid separates the reference element (2) from the sensing electrode members so that at least one pair of capacitors is formed the capacitances of which capacitors vary oppositely in response to deviation from level position of a line joining the pair of sensing electrode members and the consequent loss of parallelism of that line with the reference element. Alternating voltages are applied to the capacitors such that the product of the capacitance and the applied voltage is equal for both capacitors when parallelism exists. A detecting means senses variations of the capacitances and provides an indication of any deviation from level position of the flat support (37). The detecting means comprises an inverting amplifier including a feed-back capacitor formed by the reference element (33) and an additional electrode member (E1) disposed symmetrically with respect to the sensing electrode members (A1-D1) on the support (37).

14 Claims, 11 Drawing Figures

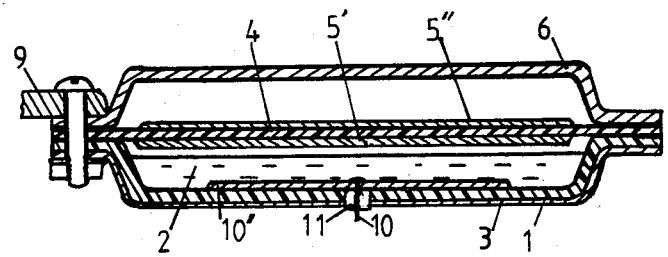
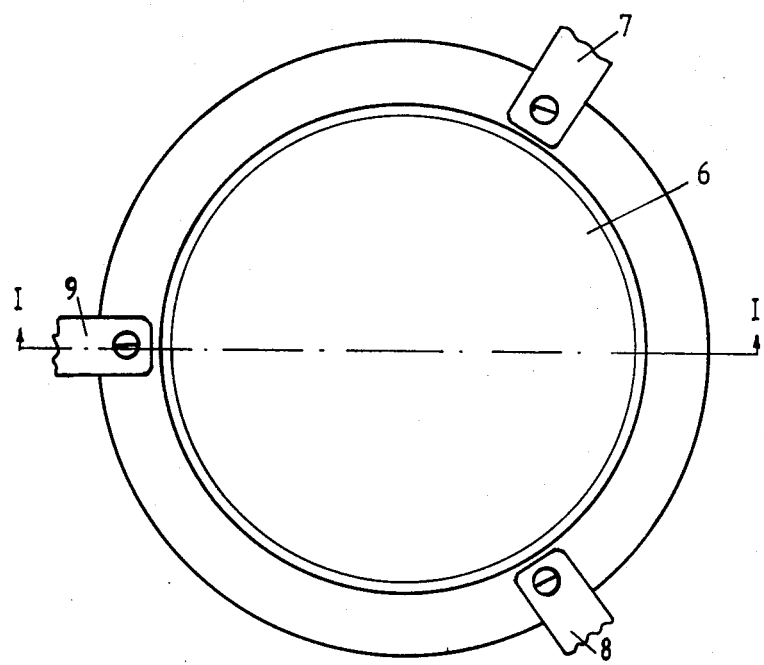

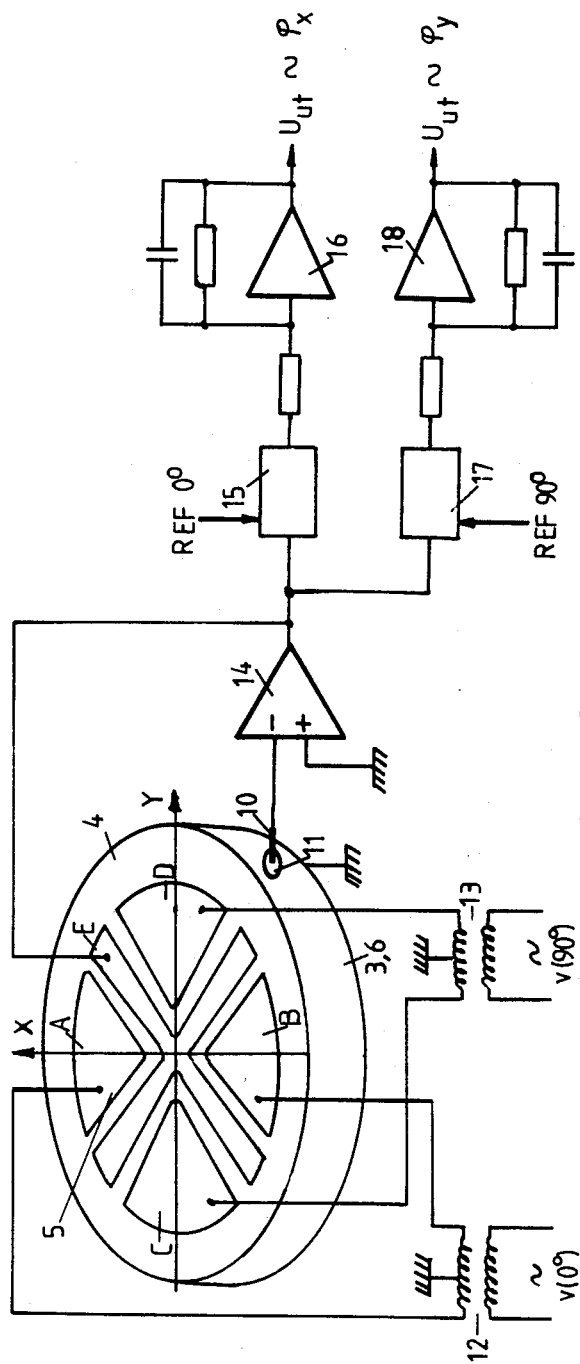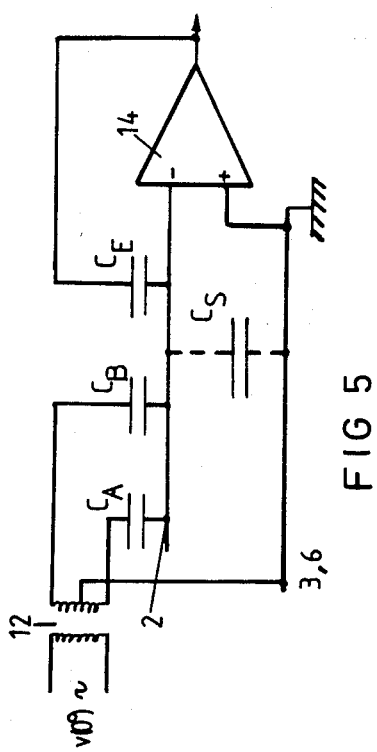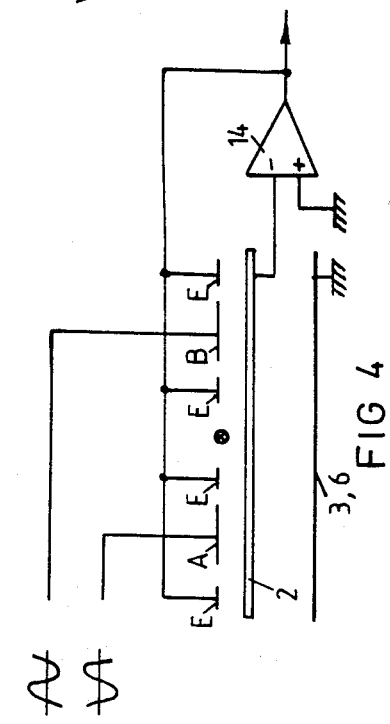
FIG 3
FIG 4
FIG 5

ELECTRONIC LEVELLING CELL

This invention relates to a levelling device, namely a device for detecting deviation from level position of a surface using a gravity-levelled surface as reference.

Theodolites and other surveying instruments include devices serving to correct or compensate for inaccurate setting up of the instrument resulting from, for example uncontrolled movements of the tripod and the alidade, i.e. the rotatable base of the instrument. Known correcting or compensating devices suffer from various drawbacks, e.g. in that they occupy a substantial space both vertically and horizontally, so that they are not suitable for mounting on or near the vertical axis of rotation of the base, in that they have an unwanted hysteresis resulting in instability problems, or that they have insufficient sensitivity.

An object of the invention is to provide an improved electronic levelling device which is suited for incorporation in a theodolite or other surveying instrument having a vertical axis of rotation of the base and by means of which the rotatable base may be accurately adjusted to a level position so that the axis of rotation is accurately vertical and/or by means of which an indication of the vertical angular deviation of the base from level position may be obtained.

In accordance with the invention there is provided a device for detecting deviation of a plane from level position, including a conductive gravity-levelled reference element defining a horizontal reference surface, at least one pair of conductive, rigidly mounted sensing electrode members jointly defining said plane and disposed adjacent the reference surface in confronting relation therewith, a dielectric fluid separating the reference surface from the sensing electrode members, the reference element, the pair of sensing electrode members and the dielectric fluid forming a pair of capacitors the capacitances of which vary oppositely in response to deviation of said plane from parallelism between the reference surface and a line joining the pair of electrode members, and means for detecting variations of the capacitances of the pair of capacitors, characterised in that the detecting means includes an alternating current source connected to the pair of capacitors and adapted to apply oppositely phased first and second alternating voltages to respective ones of the capacitors, the product of the capacitance and the applied voltage being equal for both capacitors when the reference surface and said line are parallel, and an inverting amplifier including a feed-back capacitor and having its input connected to the gravity-levelled element.

If it is desired to use the device according to the invention for levelling e.g. the alidade or rotatable base of a theodolite, this may be accomplished automatically or manually. In the first-mentioned case the output of the device is used to control levelling motors adjusting the attitude of the base until the output of the device is zero. In the last-mentioned case, the operator adjusts the attitude of the base manually until the output is zero.

Other objects and features of the invention will become apparent from the following description taken in connection with the accompanying drawings, in which:

FIG. 1 shows a section along line I—I of FIG. 2 of a levelling cell forming part of the device according to the invention;

FIG. 2 is a plan view of the levelling cell shown in FIG. 1;

FIG. 3 is a circuit diagram of a device embodying the invention;

FIG. 4 is a simplified circuit diagram corresponding to a portion of FIG. 3;

FIG. 5 is an equivalent circuit diagram corresponding to FIG. 4;

Figure 6:
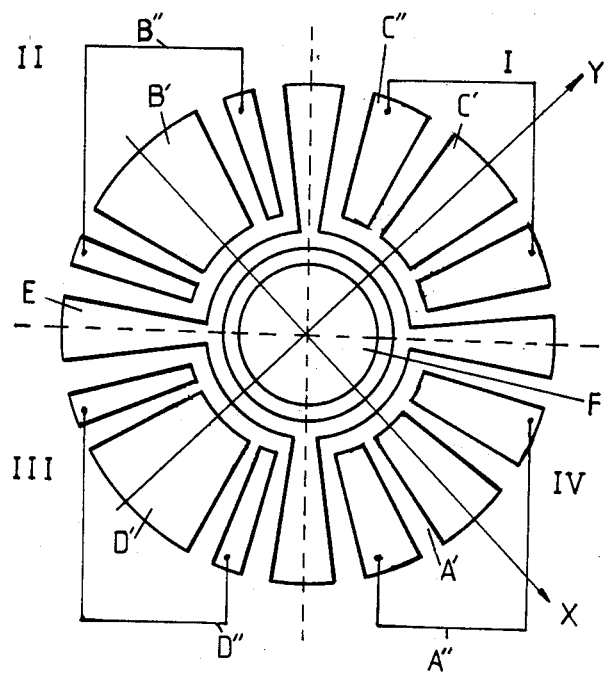
FIG. 6 shows a modified electrode pattern for the levelling cell.

FIGS. 1 and 2 show a first embodiment of the mechanical construction of the levelling cell. A cup-shaped container 1 made of electrically insulating material and having an outwardly projecting rim extending parallel to the bottom of the cup contains a body 2 of conductive liquid, such as mercury. The outer side of the cup is provided with a conductive coating 3.

A flat rigid plate 4 of an electrically insulating material is positioned over the cup 1. The plate 4 is provided with a conductive pattern 5' having substantially the same diameter as the bottom of the cup. Preferably, the pattern 5' is disposed on the underside of the plate, i.e. the side of the plate facing the liquid body 2. The upper side of the plate 4 may also have a conductive coating 5". This coating may be connected to ground, or a part of the conductive pattern 5' may also be provided on this side.

The space between the liquid body 2 and the plate 4 is filled with a dielectric fluid, which may be air or an inert gas. However, in order that waves on the surface of the liquid resulting from shaking or turning of the instrument incorporating the levelling cell may be suppressed, it is preferred to have the space filled with a damping dielectric liquid. If the conductive liquid is mercury, a silicon oil inert to mercury and having a viscosity such that formation of mercury spheres is prevented may be used.

If the dielectric fluid is air or an inert gas, thermal expansion of the liquid body 2 has no appreciable adverse effect on the mechanical stability of the device. The cup 1 may then be made of a soft or rigid material. On the other hand, if the dielectric fluid is a damping liquid, it is preferred to make the cup 1 of a soft or resilient material so that it can accommodate the thermal expansion of the conductive liquid. It is also possible to make the cup of a rigid material and provide a separate expansion chamber communicating with the cup.

A cover 6 of the conductive material or of a nonconductive material and a conductive coating is positioned on the plate 4. The cover 6 is shaped as a dish or cup similar to the cup 1 and is turned upside down.

The cup 1, the plate 4 and the cover 6 are clamped together by means of three screws evenly spaced about the periphery of the cell which is positioned on or near the vertical axis of operation of the theodolite or instrument (not shown) and secured to the base or alidade (not shown) by three tabs 7, 8 and 9.

Although the cup 1 is circular in the embodiment shown in FIGS. 1 and 2 as is preferred, other shapes may be contemplated. It is essential, however, that the cup is symmetrical in plan view about horizontal axes extending in the directions in which deviation from level position is to be detected. In all embodiments illustrated in the drawings, deviation from level position is detected in two orthogonal directions, but it is to be understood that the invention is not so limited, but applicable also in the case where deviation is to be detected in more than two directions or in two non-orthogonal directions. In the case of two orthogonal directions the cup 1 may have circular, elliptical, rectangular, octagonal or like shape.

Centrally in the bottom of the cup 1 a conductive lead-through pin 10 is disposed in an electrically insulating bushing 11. To ensure good electrical contact between the liquid body 2 and the pin 10, the bottom of the cup 1 is provided with a conductive coating 10' to which the pin 10 is connected. The pin 10 thus does not have to project far into the liquid body 2. Thereby, motion of the liquid body 2 resulting from movement of the instrument incorporating the levelling cell upon adjustment is minimized. The pin 10 is preferably positioned exactly at the center of the coating 10.

A circuit diagram of the device according to the invention incorporating the cell of FIGS. 1 and 2 is shown in FIG. 3. The conductive pattern 5 on the plate 4 is divided into five parts A, B, C, D, and E, four of which, A, B, C and D, are three-corner parts having two straight sides intersecting near the center of the plate 4 and having the third side extending along a circular path near the periphery of the plate. The four parts A, B, C, D are evenly spaced and form a pattern that is symmetrical about two orthogonal axes X and Y intersecting at the center of the plate 4.

The parts A to E of the conductive pattern 5' each serve as the one plate or electrode member of a capacitor, the other plate or electrode member of which being the body 2 of conductive liquid. It should be noted that satisfactory operation does not require the parts or electrode members A to D to be congruent. The only essential requirements to be met are that the product of the capacitance of each capacitor and the voltage applied to it be the same for each pair of capacitors on the same axis X or Y when the plane defined by the axes is parallel to the gravity-levelled reference surface defined by the body 2 of conductive liquid, and that the parts or electrode members A, B and C, D on each axis X and Y be symmetrical about the other axis Y and X, respectively, in order that cross-coupling of the axes may be avoided.

The fifth part of electrode member E is of cruciform shape with its ends or limits positioned symmetrically between adjacent straight sides of the parts A to E.

The conductive coating 3 of the cup 1 and the cover 6 are grounded.

An alternative current source includes a pair of transformers 12 and 13. The primary winding of the transformer 12 is supplied with an alternating voltage v(0°). A centre terminal of the secondary winding is grounded and the ends of the winding are connected to the electrode members A and B, respectively. The primary winding of the transformer 13 is supplied with an alternating voltage v(90°) having a phase shift of 90° relative to the voltage v(0°). The secondary winding is also provided with a grounded centre terminal and its ends are connected to the electrode members C and D, respectively.

The pin 10 connects the body 2 of conductive liquid to the negative or inverting input of an operational amplifier, 14, the positive or non-inverting input of which is grounded.

The amplifier 14 has a feed-back capacitor which may be a separate capacitor. A preferred alternative is to connect the amplifier output to the electrode member E, because temperature compensation may then be achieved as will be explained in greater detail hereinafter.

The output of the amplifier 14 is connected to a first phase detector 15, which senses the output signal during the phase intervals of the alternating voltage v(0°) in which the voltages applied to the liquid 2 via the capacitors formed between the liquid 2, on the one hand, and the electrode members A and B, on the other hand, result in variations of the output signal in the same sense, and in the middle of which the voltages applied to the liquid 2 via the capacitors formed between the liquid, on the one hand, and the electrode elements C and D on the other hand, have a zero cross over. The same output is also applied to a second phase detector 17 for sensing deviations from level position, when the capacitances associated with the electrode members C and D become different. In order to provide the sensing intervals mentioned above the phase detector 15 is suitably fed with a square voltage having the same phase as the voltage v(0°) fed to transformer 12 and the phase detector 17 is suitably fed with a square voltage having the same phase as the voltage v(90°) applied to transformer 13.

The output signal from the phase detector 15 during a half period is amplified in an amplifier 16. The output from this amplifier, has a given relationship to the angular deviation from horizontal or level position of the plate 4 along a line through the centroids of area of the electrode members A and B (X axis).

The output signal from the phase detector 17 during a half period is amplified in an amplifier 18. The output signal from this amplifier has a given relationship to the angular deviation from horizontal or level positions of the plate 4 along a line through the centroids of area of the electrode members C and D (Y axis).

The output signal from the amplifier 14 may be detected in other ways, e.g. sensed only in predetermined phase positions.

FIG. 4 shows a simplified diagram and FIG. 5 shows an equivalent circuit diagram of FIG. 3 for the part of the device including the electrode members A, B and E and the operational amplifier 14, i.e. for the part providing indication of angular deviation about the Y axis. Alternating voltages having the same amplitude but having a relative phase shift of 180° are applied to the electrode members A and B.

When the cell is accurately levelled the capacitances of the capacitor $C_A$ and $C_B$ formed by the electrode members parts A and B, respectively, and the liquid body 2 are the same. When the device is angularly displaced about the Y axis, such that the plate 4 with the electrode members A, B and E loses its parallelism with the liquid surface, the capacitances of the capacitors $C_A$ and $C_B$ are changed in opposite senses. An alternating voltage will appear over the liquid and the ground terminal. This voltage is fed to the phase inverting input terminal of the amplifier 14 and is fed back inverted from the output of amplifier 14 by the capacitor $C_E$ formed between the electrode member E and the liquid.

Through this arrangement the liquid 2 is brought back to a potential which is at least approximately 0 V.

It is to be noted that for each pair of electrode members the product of the applied voltage and the capacitance of the associated capacitor should be the same. This means that if one of the electrode members of a pair is supplied with a voltage twice the voltage applied to the other electrode member the surface area of the first-mentioned electrode member should be half as large as the surface area of the electrode member. Thus, it is quite possible to have cooperating electrode members of different sizes.

Since only small angular deviations from level position are detected by means of the device according to the invention, the capacitances $C_A$, $C_B$, $C_E$ are proportional to the surface area A of the electrode members divided by the distance d between the electrode members and the liquid surface, i.e. A/d. Calculations have shown that temperature compensation of the device can be obtained if the electrode members A, B, C, D are disposed on the upper side of the plate 4 (see FIG. 1) and the pattern part E is disposed on the underside of the plate 4 and the thickness of the plate 4 approximately equals the distance between the plate 4 and the surface of the liquid body 2. This applies to all embodiments shown in the drawings.

Figure 7:
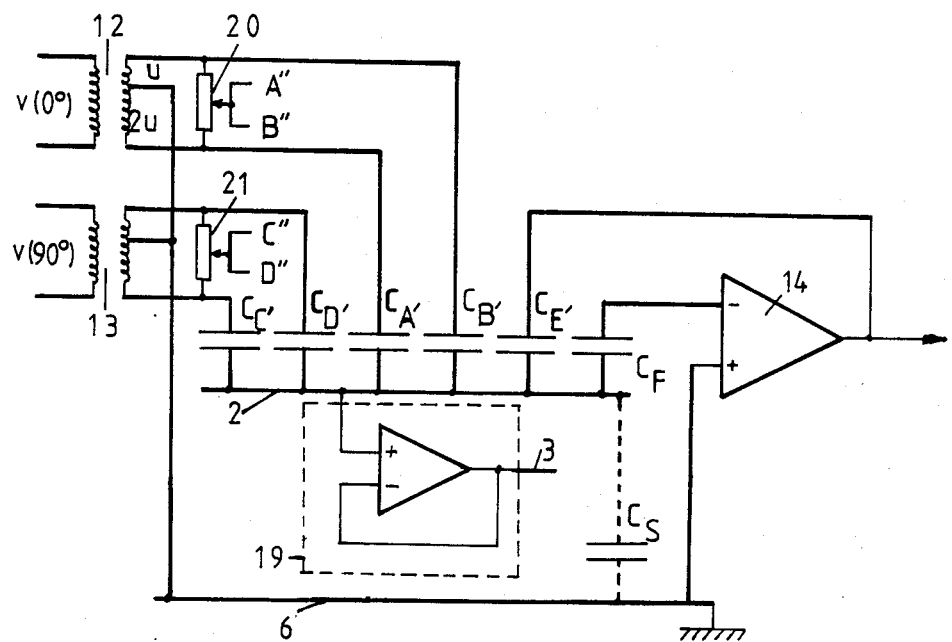
FIG. 7 is an equivalent circuit diagram of a device according to the invention incorporating the electrode pattern shown in FIG. 6.

In the embodiment shown in FIGS. 1 to 3 the potential of the liquid 2 is sensed directly. Since deviation of the potential from a mean value in certain phase positions is the most interesting quantity, sensing may also be effected capacitively. This is done in the embodiment shown in FIGS. 6 and 7. FIG. 6 shows the pattern on the plate 4 and FIG. 7 shows an equivalent circuit of the device in accordance with the invention except for the parts following the amplifier 14 and including the phase detectors 15 and 17 (see FIG. 1). Contrary to FIG. 5, FIG. 7 shows the equivalent circuit for both the X axis and the Y axis, i.e. all the capacitors $C_A$, $C_B$, $C_C$, $C_D$ are included in the circuit diagram.

As in FIG. 3 the conductive pattern is divided into quadrants. Centrally of the pattern a circular part F is disposed. This central part is connected to the phase inverting input terminal of the operational amplifier 14 and the detecting capacitor $C_F$ is formed between the member F and the liquid 2. The feedback capacitor $C_E$ is formed by the pattern part E' which consists of a ring disposed around the pattern part E. Four evenly spaced arms extend radially from the ring towards the periphery.

In the embodiment shown in FIG. 6 the pattern is divided into quadrants I, II, III, IV defined by a pair of orthogonal diametrical lines through the arms of the electrode members.

As is apparent from FIG. 7 the grounded tap of the secondary winding of the transformer 12 is offset from the center of the winding such that the voltage across one of the second winding segments is twice the voltage across the other segment. In order to produce the same result as in the embodiment shown in FIG. 3 the surface area of the electrode member A connected to the outer end of the longer winding segment having the voltage 2u must be half as large as the electrode part B connected to the outer end of the shorter winding segment having the voltage u. As is apparent from FIG. 6 the electrode members A' and C' are half as large as the electrode members B' and D'.

In FIGS. 6 and 7 a way of compensating for mechanical maladjustment of the levelling cell is shown. This compensation is obtained by electrode segments A", B", C", D" positioned between each arm of the electrode segment E' and the adjacent edges of the electrode segments A' to D'. The electrode segments A" or opposite sides of the electrode segment A' are interconnected outside the pattern as are the two electrode segments B" or opposite sides of the electrode segments, and so on. Preferably, the electrode segments A" to D" are disposed at the same distance from the liquid surface as the part E'.

As is apparent from FIG. 7, compensation is accomplished by a potentiometer 20 connected across the secondary winding of transformer 12 with the electrode segments A", B" connected to the potentiometer tap and by a potentiometer 21 connected across the secondary winding of transformer 13 with the electrode segments C", and D" connected to the potentiometer tap.

In order to prevent the high capacitance between the liquid 2 and the coating 3 from having a substantial influence on the detecting circuit and at the same time "ground" coating 3 in order to achieve a shielding effect, the coating 3 may be connected to the same potential as the liquid through a so called bootstrap circuit 19, which in FIG. 7 is shown in form of an amplifier the gain of which is 1.

In FIG. 7 the capacitance $C_S$ between the liquid 2 and the shield 6 is also symbolically shown. This capacitance should be as small as possible but can not be completely eliminated.

In FIG. 7 the liquid 2 is not connected directly to the phase-inverting input terminal of the amplifier 14. Instead, its potential variations are sensed capacitively by the capacitor $C_F$.

Figure 8:
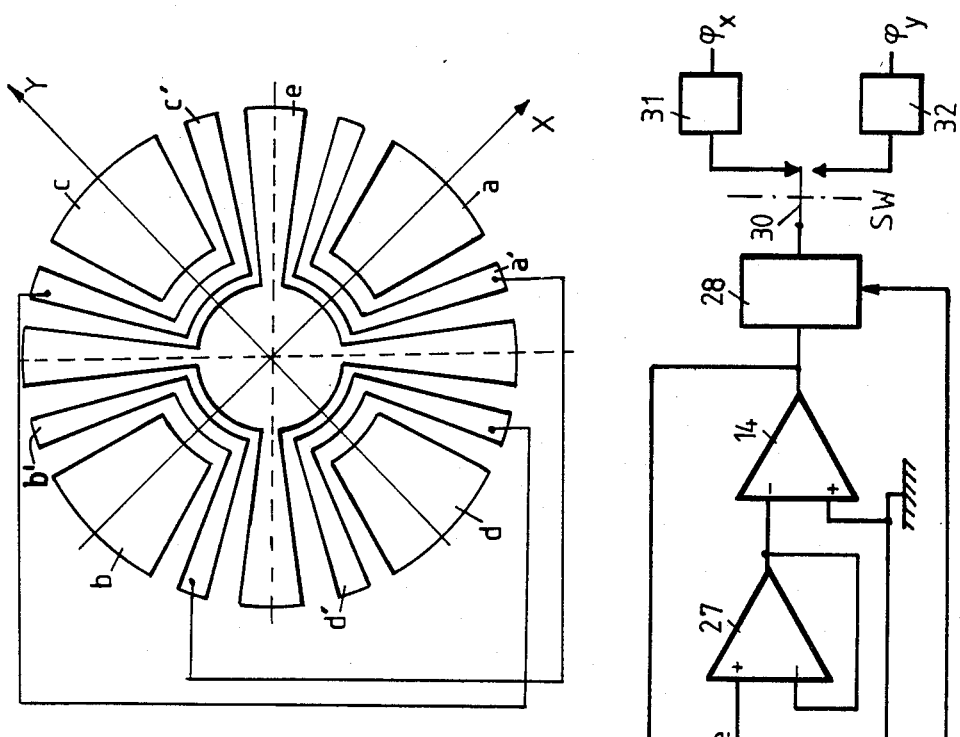
FIG. 8 shows a further modified electrode pattern.
Figure 9:
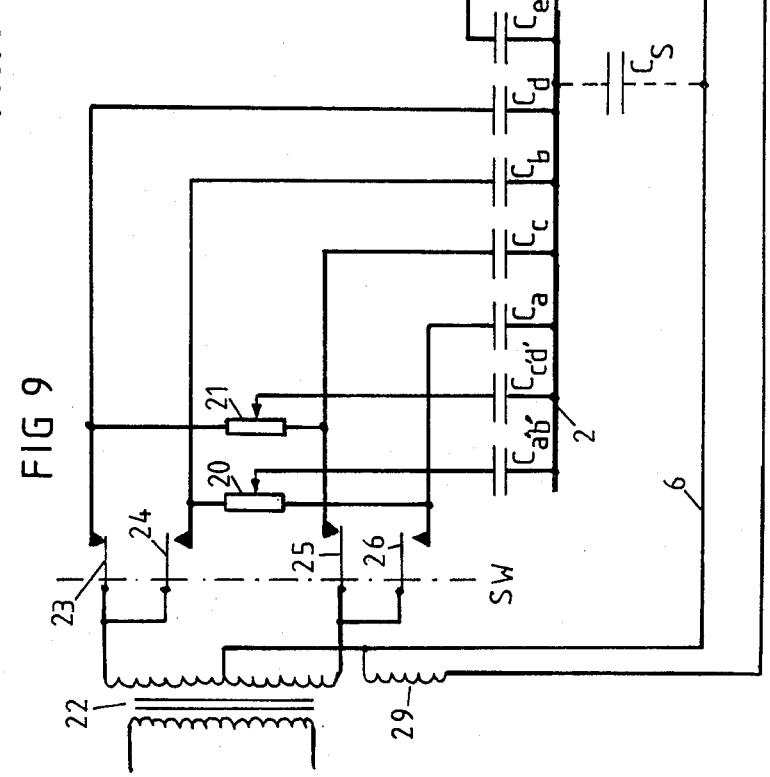
FIG. 9 is an equivalent circuit diagram of a further embodiment of the device according to the invention.

In FIGS. 8 and 9 still another embodiment of the device in accordance with the invention is shown. This embodiment of the conductive pattern and the circuit represents the presently preferred mode of carrying out the invention. In this embodiment the means for detecting angular deviation about the X axis and Y axis are supplied separately and alternatingly with voltage. A single transformer 22 is provided the secondary winding of which has a grounded center tap. One end of the secondary winding is connected to one terminal of two switches 23, 24 and the other end of the winding is connected to two switches 25, 26. The switches 23 to 26 are repetitively actuated in unison by a switch actuator SW, such that switches 23, 25 are opened when the switches 24, 26 are closed and vice versa. The period of the switching cycle is substantially longer than the period of the alternating voltage applied to the primary winding. Thus, in one switch position, the capacitors $C_a$, $C_b$ are operative so that the device operates to sense angular deviation from level position along the X axis (rotation around the Y axis).

The conductive pattern on the plate 4 is shown in FIG. 8. In this embodiment correction electrode members a', b', c', d' positioned on opposite sides of each electrode member a, b, c, d are interconnected by arcuate conductive bands radially inwardly of the associated electrode member a-d. As in the embodiment shown in FIGS. 6 and 7, the electrode members a', b' are connected to the tap of a potentiometer 20 coupled across the electrode members a and b, and the electrode members e', d' are connected to the tap of a potentiometer 21 coupled across the electrode members c and d.

The liquid 2 is directly connected to a buffer stage in form of an amplifier 27 having unity gain and high input resistance. The output of the amplifier 27 is connected to the phase-inverting input terminal of the operational amplifier 14, which has its output connected to the electrode member e which is of symmetrical cruciform shape. The output of the amplifier 14 is also connected to a phase detector 28. The transformer 22 has an additional secondary winding 29 one end of which is connected to ground and the other end of which is connected to the input of the phase detector 28. The phase detector 28 senses the magnitude of the signal from the amplifier 14 during one half-period of the supply voltage. A make-and-break switch 30 actuated in unison with the switches 23 to 26 has its common contact connected to the output of the amplifier 14 and has its other contacts connected to each one of two averaging circuits 31, 32. Each such circuit calculates the mean value of the input signal during signal supply periods. A very simple form of averaging circuit is in the form of a low pass filter, which filters off rapid signal variations. One of the circuits 31 has a signal supplied to it when the electrode members c and d are connected to the voltage supply. The output from this circuit is uniquely related to the angular deviation along the Y axis (rotation around the X axis). The other circuit 32 has a signal supplied to it when the electrode members a and b are connected to the voltage supply. The output from this circuit is uniquely related to angular deviation along the X axis (rotation around the Y axis).

The coating 3 may be connected to the liquid in the manner shown in FIG. 7. It may also be connected to the output of the amplifier 27. In this case an outer shield, e.g. a grounded shield (not shown), then is disposed outside the coating 3 to enclose the entire mechanical part at such a distance from this that the capacitance to the shield is low. However, if an outer shield is disposed around the mechanical part then the electrically conducting coating 3 might as well be omitted.

Figure 10:
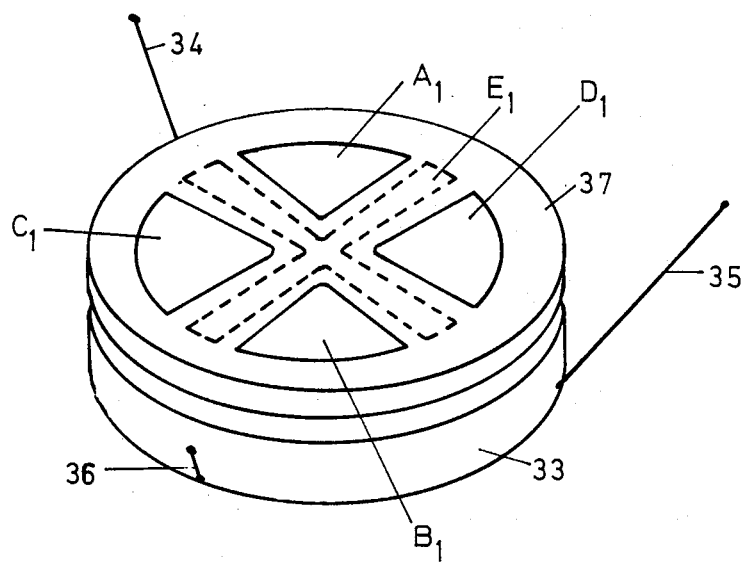
FIGS. 10 and 11 are respectively a perspective view and a sectional view of a further embodiment of the levelling cell incorporated in the device according to the invention.
Figure 11:
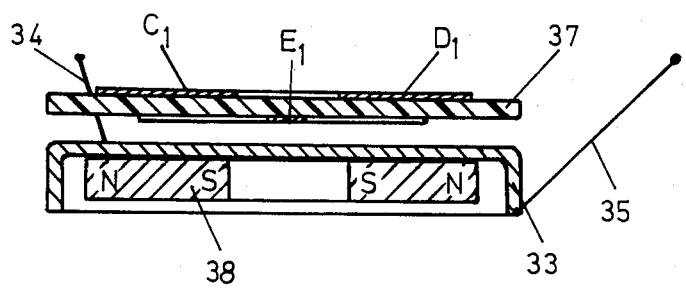

FIGS. 10 and 11 show a second embodiment of the mechanical construction of the levelling cell.

In this embodiment the body 2 of conductive liquid in the cup 3 in FIG. 1 has been exchanged for a horizontal conductive plate 33, which has an annular downwardly extending flange around its periphery. The plate 33 is suspended by three strings 34, 35, 36, each of which is connected at one end to the lower end of the flange and at the other end to the base (not shown) of the instrument to be levelled and thus also in relation to the plate 37 which is equivalent to the plate 4 in FIG. 1. Preferably, the strings are inclined as is shown in FIGS. 10 and 11 in order to provide for increased stability of the device. The three strings are symmetrically arranged about the periphery of the plate. It should be noted that the number and positioning of the strings are not limited to what is shown in FIGS. 10 and 11.

Plate 37 has also a printed conductive pattern $A_1, B_1, C_1, D_1, E_1$ disposed on opposite sides. In order to obtain temperature compensation the pattern part $E_1$, which forms the feed back capacitor electrode member for the operational amplifier 14, is positioned on the underside of plate 37 while the pattern parts $A_1$ to $D_1$ forming electrode members to which the alternating supply voltages are applied are disposed on the upper side of the plate 37. The conductive pattern and its incorporation in the electric circuitry may be as shown in FIGS. 3 to 9. In order that a conductive connection from the plate 33 to the phase-inverting input terminal of the amplifier 14 may exist, at least one of the strings 34 to 36 is conductive and has its upper end connected to the amplifier input. On the underside of the plate 33 and surrounded by the flange a magnet array 38 is disposed. This magnet array is symmetric about the center such that like poles face the flange. The purpose of this magnet array is to suppress the eddy currents which are generated when the plate 33 moves in relation to the plate 37. Also, the magnet array functions as a weight and thus has also a stabilizing effect on the levelling cell.

The entire cell as shown in FIGS. 10 and 11 may be placed in a housing having at least a coating of conductive material connected to ground. It is to be noted that the cell shown in FIGS. 10 and 11 also may be placed upside down without changing its operation. In this case the strings, by which the plate 33 is suspended have their points of attachment remote from the plate 33 positioned above the plate.

Many modifications of the invention are possible. For although in the illustrated embodiments the applied voltage is sinusoidal, the applied voltage may for example be pulses. The pulses may be fed simultaneously and with different polarities to the pairs of electrode members formed by the parts of the conductive pattern.

The pattern design may also be varied for example, the capacitor $C_F$ may be formed by an annular pattern part encircling the pattern shown in FIG. 3.

The conductive pattern need not to be provided on a flat surface. For example it may be provided on a slightly domed cup.

In the drawings a single electrical circuit including the operational amplifier 14 is connected to the levelling cell. Alternatively, a separate operational amplifier for each sensing direction may be provided, although the conductive pattern then has to have separate parts E for different directions in order that separate feed back capacitors $C_E$ may be provided.

If in the embodiment shown in FIGS. 1 and 2, the potential of the conductive liquid is to be sensed directly, instead of a lead-through 10, 11 through the bottom wall of the cup 3, the conductive pattern 5 on plate 4 in FIG. 6 may be used. A pin may be positioned in the center of the plate and electrically connected to the pattern part F. The pin extends downwardly from the plate into the liquid 2.

We claim:

1. A device for detecting deviation of a plane from level position, including a conductive gravity-levelled reference element defining a horizontal reference surface, at least one pair of conductive, rigidly mounted sensing electrode members jointly defining said plane and disposed adjacent the reference surface in confronting relation therewith, a dielectric fluid separating the reference surface from the sensing electrode members, the reference element, the pair of sensing electrode members and the dielectric fluid forming a pair of capacitors the capacitances of which vary oppositely in response to deviation of said plane from parallelism of the reference surface and a line joining the pair of electrode members, and means for detecting variations of the capacitances of the pair of capacitors, characterized in that the detecting means includes an alternating current source connected to the pair of capacitors and for applying oppositely phased first and second alternating voltages to respective ones of the capacitors, the product of the capacitance and the applied voltage being equal for both capacitors when the reference surface and said line are parallel, and an inverting amplifier including a feed-back capacitor and having its input connected to the gravity-levelled element.

2. A device according to claim 1, characterized in that the alternating current source is adapted to apply the first and second voltages sequentially and repeatedly and in that the detecting means is adapted to measure the output signals of the amplifier separately for each pair of sensing electrode members during the intervals the voltages are applied to the respective pairs.

3. A device according to claim 1 or 2, characterized in that the reference element and the sensing electrode members are enclosed in a grounded conductive shield and in that the alternating voltages are applied across the shield on the one hand and across respective ones of the sensing electrode members on the other hand.

4. A device according to claim 1, characterized by an additional electrode member positioned adjacent the reference element and immovable relative to the sensing electrode members the additional electrode member being connected to the output of the amplifier and serving together with the reference element as the feed-back capacitor for the capacitive feed-back of the amplifier output.

5. A device according to claim 4, characterized in that the additional electrode member is spaced from the reference element by a distance that is smaller than the distance separating the sensing electrode members from the reference element.

6. A device according to claim 4, characterized in that the electrode members are positioned on an electrically insulating plate, the sensing electrode members being positioned on the side of the plate facing away from the reference element and the additional electrode member being positioned on the side of the plate facing the reference element.

7. A device according to claim 1 having two pairs of sensing electrode members, characterized in that the alternating voltages applied to the sensing electrode members are differently phased for different pairs and in that for each pair a sensing means is connected to the amplifier output during a predetermined phase interval of the voltage applied to that pair in the middle of which interval the voltage applied to the other pair has a zero passage.

8. A device according to claim 1, characterized in that the reference element is a body of conductive liquid contained in a circular cup, and in that the outer side of the cup is provided with a conductive coating coupled with the body of conductive liquid by way of a boot-strap circuit.

9. A device according to claim 1, characterized in that the reference element is a solid planar body having a gravity-levelling suspension including a plurality of strings attached to the periphery of the planar body at circumferentially spaced locations.

10. A device according to claim 9, characterized in that a magnet array is provided on the side of the planar body facing away from the sensing electrode members, the magnet array being symmetrical about an axis of the planar body and adapted to oppose eddy currents in the planar body.

11. A device according to claim 1, characterized by having two pairs of sensing electrode elements, said pairs being positioned on respective ones of two lines contained in said plane and including an angle between them.

12. A device according to claim 1, characterized in that the input of the amplifier is capacitively coupled with the reference element through a further electrode member.

13. A device according to claim 1, characterized in that at least one pair of the sensing electrode members is associated with auxiliary electrode members positioned symmetrically adjacent the sensing electrode members and connected to the tap of a potentiometer connected between the sensing electrode members of said one pair.

14. A device according to claim 13, characterized by a processing circuit adapted to average for each pair of sensing electrode members the signal obtained therefrom over a period of time that is substantially longer than the period of the first and second alternating voltages.

* * * * *